US012623423B2

(12) United States Patent (10) Patent No.: US 12,623,423 B2
Dettorre et al. (45) Date of Patent: May 12, 2026

(54) METHOD FOR MANUFACTURING TIRE BLANKS

(71) Applicant: Compagnie Generale Des Etablissements Michelin, Clermont-Ferrand (FR)

(72) Inventors: Jean-Marie Dettorre, Clermont-Ferrand (FR); Nicolas Bard, Clermont-Ferrand (FR); Quentin Deniau, Clermont-Ferrand (FR); Michel Druet, Clermont-Ferrand (FR); Matthieu Lutz, Clermont-ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 239 days.

(21) Appl. No.: 18/036,581

(22) PCT Filed: Nov. 17, 2021

(86) PCT No.: PCT/FR2021/052028
§ 371 (c)(1),
(2) Date: May 11, 2023

(87) PCT Pub. No.: WO2022/106781
PCT Pub. Date: May 27, 2022

(65) Prior Publication Data
US 2023/0405955 A1 Dec. 21, 2023

(30) Foreign Application Priority Data
Nov. 18, 2020 (FR) ....................................... 2011827

(51) Int. Cl.
B29D 30/30 (2006.01)
B29D 30/00 (2006.01)

(52) U.S. Cl.
CPC ..... B29D 30/3028 (2013.01); B29D 30/0061 (2013.01)

(58) Field of Classification Search
CPC .... B29D 30/0061; B29D 30/14; B29D 30/16; B29D 30/1607; B29D 30/1621;
(Continued)

(56) References Cited

U.S. PATENT DOCUMENTS 10,445,653 B1 10/2019 Veness et al.
2007/0199661 A1 8/2007 Nicolas et al.
(Continued)

FOREIGN PATENT DOCUMENTS

EP 1533107 A1 5/2005
FR 1378843 A 11/1964
(Continued)

OTHER PUBLICATIONS

Ogawa Yuichiro, JP-2010208110-A, machine translation. (Year: 2010).*
(Continued)

*Primary Examiner* — Sedef E Paquette
(74) *Attorney, Agent, or Firm* — Dickinson Wright PLLC

(57) ABSTRACT

A method of laying elastomeric elements using a facility including a drum for manufacturing tire blanks and at least one collaborative robotized arm equipped with at least one effector. A stage of laying an elastomeric element includes a predetermined sequence of steps. The sequence comprises the steps of grasping and drawing the elastomeric element towards the drum using the robotized arm. The laying of elastomeric elements includes instructions which can be executed by the processor of a control unit in order to implement. The sequence includes a stage of automatic performance of a step according to the sequence. The sequence also includes a stage of interruption of the
(Continued)

sequence. The sequence further includes a stage of manual performance of the interrupted step or the next step according to the sequence.

9 Claims, 2 Drawing Sheets

(58) Field of Classification Search
CPC ............ B29D 30/1628; B29D 30/1635; B29D 30/1642; B29D 30/165; B29D 30/1657; B29D 30/28; B29D 30/30; B29D 30/3007; B29D 30/3021; B29D 30/3028; B29D 30/3035; B29D 30/3042; B29D 30/305; B29D 30/3057; B29D 30/44; B29D 2030/4468; B29D 2030/4487; B29D 2030/4493
USPC ...................................................... 156/128.1
See application file for complete search history.

(56)                References Cited

U.S. PATENT DOCUMENTS

| | | | |
|---|---|---|---|
| 2011/0232830 A1* | 9/2011 | Rey ........................ | B29D 30/72 |
| | | | 156/111 |
| 2017/0015076 A1* | 1/2017 | Nomura ................. | B29D 30/48 |
| 2019/0084257 A1* | 3/2019 | Amurri ................. | B65H 26/02 |
| 2022/0001634 A1 | 1/2022 | Dettorre et al. | |

FOREIGN PATENT DOCUMENTS

| | | | |
|---|---|---|---|
| FR | 3088575 A3 | | 5/2020 |
| JP | 2010208110 A | * | 9/2010 |

OTHER PUBLICATIONS

Nair, "Combining Self-Supervised Learning and Imitation for Vision-Based Rope Manipulation", publication arXiv 1703.02018v1, Mar. 6, 2017, pp. 1-8, Berkeley, CA, USA.

* cited by examiner

METHOD FOR MANUFACTURING TIRE BLANKS

CROSS-REFERENCE TO RELATED APPLICATION

This application claims priority to and the benefit of PCT Patent Application No. PCT/FR2021/052028 filed on 17 Nov. 2021, entitled "METHOD FOR MANUFACTURING TIRE BLANKS", and French Patent Application No. FR2011827, filed on 18 Nov. 2020, entitled "METHOD FOR MANUFACTURING TIRE BLANKS".

BACKGROUND

1. Field

The disclosure concerns the field of tire manufacture, and more particularly concerns a method for manufacturing tire blanks and a facility allowing implementation of such a method.

2. Related Art

A tire is divided into three separate zones, comprising a crown reinforcement and a tread intended to come into contact with the ground, beads intended to ensure the attachment of the tire to the rim of a wheel, and sidewalls intended to connect the crown to the beads. In order to connect the crown to the beads, a tire generally comprises a carcass reinforcement.

To manufacture a tire blank, elements in the form of bead cores, strips or plies, are successively assembled so as to form a cylindrical carcass reinforcement. Then the cylindrical carcass reinforcement is transformed into a toroidal carcass reinforcement during a stage known as conformation. During this transformation, the crown of the carcass reinforcement is stretched so as to increase the diameter and the beads are moved axially closer together. Finally, elements in the form of strips or plies are successively positioned on the crown of the carcass reinforcement so to form a crown reinforcement and a tread on top.

The assembly and conformation stages are generally performed on a cylindrical drum for manufacturing tire blanks, which is movable in rotation about an axis of revolutionary symmetry. Elements in the form of threads, strips or plies are laid circumferentially on the drum or on the tire blank during production. The laying stages are performed manually or automatically.

When the laying stages are performed manually, an operator situated facing the drum takes the end of an element, e.g. a ply wound around a reel, draws it up to the drum, positions it and fix it to the drum or the tire blank during production. The drum is then set in rotation so as to perform a complete revolution. During rotation of the drum, the operator guides the ply such that the winding of the ply forms a substantially straight cylinder. The operator then cuts the ply and adjusts the joint between the two ends of the ply. However, manual performance has well-known drawbacks. In particular, the speed and precision of the operator are limited. Approaching or exceeding these limits also leads to an increase in difficulty of the operator's work and his cognitive load, which may lead to a reduction in quality of the tire blanks produced or even the safety of the operator.

In addition, automation of the laying stages as performed manually has significant technical difficulties, such as design of a production machine able to implement said laying stages, and above all programming of said machine so that it is able to execute said laying stages.

When a tire blank is manufactured automatically, there are multiple design strategies which result in various methods and machines.

For example, a tire blank manufacturing machine is known in which a drum is movable by means of a carriage or robotized arm between several laying stations, each laying station being able to lay a specific element such as a bead core or strip. Since each station has a different production rate, the fastest laying stations are not fully employed, which reduces their efficiency. Furthermore, the design, production and use of such an assembly machine are very complex and costly. In fact, the reliability of the machine—or in other words, its ability to produce a tire blank without defect—is reduced since this results from the product of the reliability of each laying station taken individually. Consequently, the net operating time of such a machine is less advantageous than the net operating time of a machine having fewer laying stations.

A tire blank manufacturing machine is also known which comprises only two laying stations, each laying station being able to lay a set of preassembled elements. Thus two complete revolutions of the drum are sufficient to lay a first set intended to constitute a carcass reinforcement, and a second set intended to constitute a crown reinforcement and a tread. Nonetheless, such a manufacturing machine requires adaptation of the architecture and composition of the tire blank, which imposes considerable constraints on the process of design and industrialization of the tire.

It is an object of the disclosure to remedy the drawbacks of the prior art and provide a flexible and productive solution.

SUMMARY

This object is achieved by the disclosure which, in a first aspect, concerns a method for automatically and successively laying elastomeric elements using a facility for manufacturing tire blanks, comprising a drum for manufacturing tire blanks, at least one collaborative robotized arm equipped with at least one effector, a stage of laying an elastomeric element, comprising a predetermined sequence of steps, the sequence comprising the steps of grasping and drawing the elastomeric element towards the drum using said arm, wherein the automatic and successive laying of elastomeric elements includes instructions which can be executed by the processor of a control unit in order to implement:

a stage of automatic performance of a step according to said sequence, a stage of interruption of said sequence;

a stage of manual performance of the interrupted step or the next step according to said sequence.

Thus a laying station is able to automatically lay any element such as a bead core, a strip or a ply, or any set of preassembled elements. The different elements are laid automatically by the same laying means, namely the robotized arm or arms. Consequently, the assembly facility is flexible in contrast with the multi-station automatic assembly machines of the prior art, in which each station is dedicated to the laying of a specific element or preassembled set.

Furthermore, the production method according to the disclosure allows the collaborative manufacture of tire blanks, which offers the advantage of avoiding the systematic intervention of an operator for non-ergonomic tasks with low added value. For example, the operator is required to intervene only for laying certain elastomeric products for which the robotized arm is not yet suitable or programmed, or to monitor the quality of a tire blank during production.

Also, the laying method of the type "grasping and drawing of an elastomeric element towards said drum" is particularly suitable for manual laying of an elastomeric element, and consequently the collaborative work between the robotized arm and the operator, which allows a reduction in the duration of operator interventions and an increase in the net operating time of the manufacturing facility. The "net time" means the time during which the machine is manufacturing tire blanks, disregarding the time linked to production rate differences and faults.

Finally, the robotized arm is more precise than an operator while being faster, which allows an improvement in quality of the manufactured tire blanks and an increase in the useful operating time of the manufacturing facility. The "useful time" means the "net time" disregarding the time linked to the production of tire blanks of unsatisfactory quality.

Preferably, the elastomeric element takes the form of a continuous strip and said sequence comprises, following the drawing step, the step of guiding the elastomeric element during its winding around the drum, and the steps of cutting and joining said element.

Similarly, a method of this type is particularly suitable for the manual laying of an elastomeric element, and consequently the collaborative work between the robotized arm and the operator, which allows the reduction in the duration of operator interventions and the increase in the net operating time of the manufacturing facility.

Advantageously, the interruption stage comprises a sub-stage of identifying an indication that a stage of automatic performance of a step has not been successfully performed, wherein to implement said sub-stage, the manufacturing facility comprises first measurement means able to evaluate the state of the tire blank during production, second measurement means able to evaluate the state of the manufacturing facility, and a database containing data taken from said first and second measurement means and associated with the automatic steps previously performed and associated with the success or failure of said steps.

Thus the manufacturing facility is autonomous for evaluating the quality of the manufactured tire blanks. Also, the database provides the manufacturing facility with the possibility of implementing an automatic learning process, supervised or otherwise, and preferably self-supervised. Such a learning process is known and described in patent U.S. Ser. No. 10/445,653. Thus the manufacturing facility precisely evaluates the quality of the tire blanks during production, which allows an improvement in the relevance of operator interventions and also the increase in useful operating time of the manufacturing facility.

Preferably, the interruption stage comprises a sub-stage of detecting an operator at the laying station of the manufacturing facility using operator detection means. Thus the operator may intervene at the laying station in order to manually perform one or more steps of a laying stage in collaboration with the robotized arm and in complete safety.

Preferably, the first measurement means comprise three-dimensional vision means, and the second measurement means comprise force sensors arranged on the collaborative robotized arm.

Advantageously, the interruption stage comprises, following the sub-stage of identifying an indication that a stage of automatic performance of a step has not been successfully performed, a sub-stage of selecting a corrective action to be performed from a list of known corrective actions and according to predefined criteria.

Thus the manufacturing facility is autonomous for performing corrective actions, which allows firstly a limiting of the number of operator interventions and the duration of the corrective actions in general, and secondly an increase in the net operating time of the manufacturing facility.

Preferably, the stage of manual performance of the interrupted step or the next step in said sequence comprises a capitalization sub-stage in which the database is updated with data taken from the first measurement means during the manual performance of said step.

Thus the control unit learns from the failure of an automatic laying stage and improves its ability to identify an indication that an automatic laying stage in progress has not been performed successfully, which allows a limiting of operator interventions and an increase in the net operating time of the manufacturing facility.

Advantageously, the stage of manual performance of the interrupted step or the next step in said sequence comprises a capitalization sub-stage in which the list of known corrective actions is updated on the basis of data taken from the second measurement means during the manual performance of said step.

Thus the manufacturing facility is able to select corrective actions from a progressively enriched list of actions, which allows a limiting of operator interventions and the increase in the net operating time of the manufacturing facility.

Preferably, a step or a corrective action is scheduled according to a model comprising sequences of images of said steps or said corrective actions previously performed, according to an initial configuration of said image sequence and according to a final configuration of said image sequence.

Thus the manufacturing facility is autonomous for scheduling automatic laying stages or corrective actions in a manner suitable for the circumstances. Also, the model and the vision means give the manufacturing facility a means for implementing an imitation process. Such an imitation process is known and described in particular in publication arXiv 1703.02018v1 of 6 Mar. 2017 entitled "Combining Self-Supervised Learning and Imitation for Vision-Based Rope Manipulation".

Advantageously, the stage of automatic performance of a step according to said sequence comprises a capitalization sub-stage in which the database is updated with data taken from the first measurement means during the automatic performance of said step.

Preferably, the stage of automatic performance of a step according to said sequence comprises a capitalization sub-stage in which the list of known corrective actions is updated on the basis of data taken from the second measurement means during the automatic performance of said step.

The disclosure also concerns a facility for manufacturing tire blanks, comprising a drum for manufacturing tire blanks, at least one collaborative robotized arm equipped with at least one effector, a control unit comprising a processor and a memory accessible by said processor, the memory containing instructions which, once executed, cause the processor to implement the method of automatically and successively laying elastomeric elements according to the first aspect of the disclosure.

BRIEF DESCRIPTION OF THE DRAWINGS

The disclosure will be better understood from the description which is based on the following figures.

DESCRIPTION OF EMBODIMENTS

On the different figures, identical or similar elements carry the same reference. The description is not therefore systematically repeated.

Figure 1:
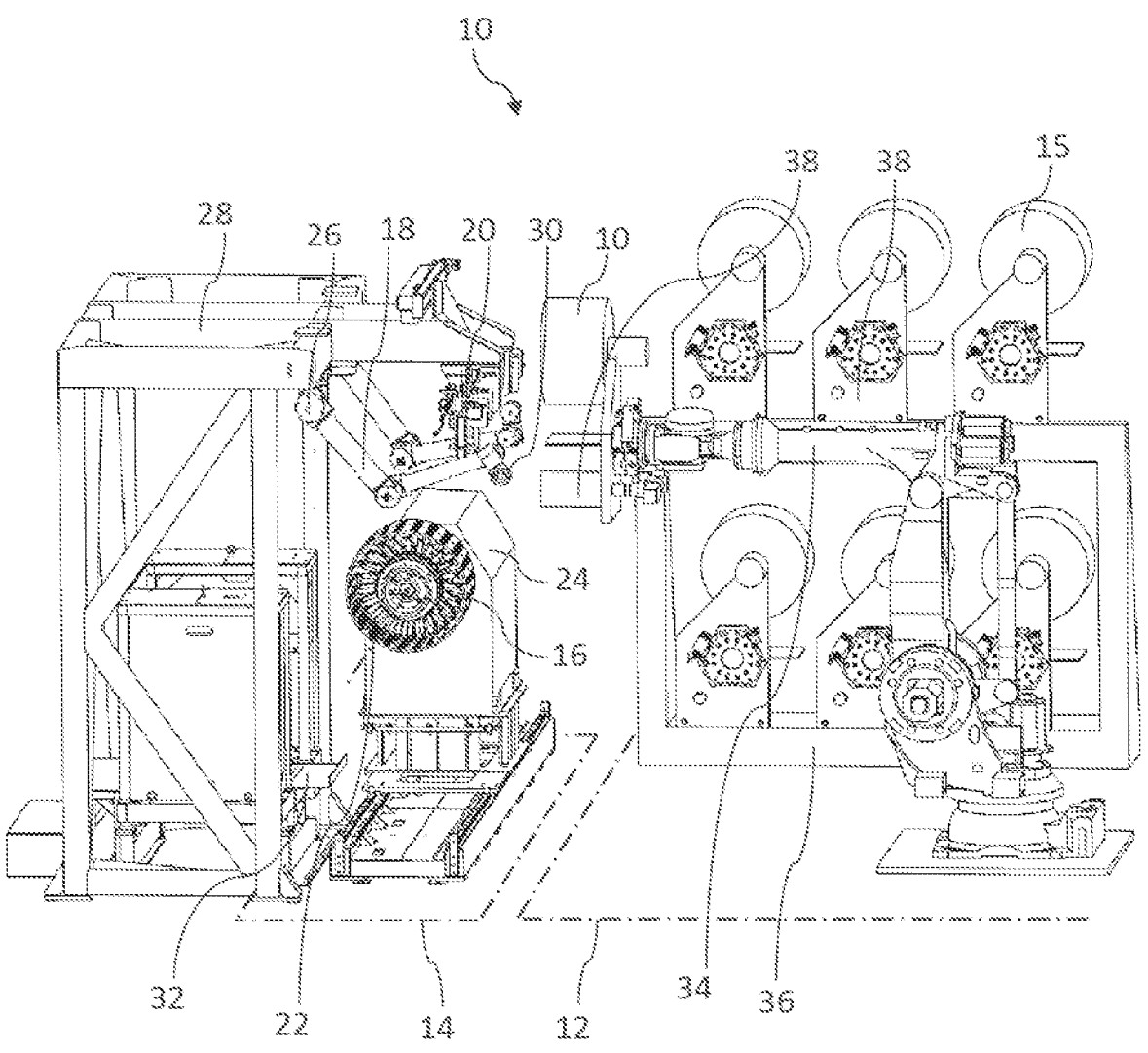
FIG. 1 is a general view of a manufacturing facility implementing a method according to the disclosure.

FIG. 1 illustrates a facility 10 for manufacturing tire blanks. The manufacturing facility comprises a station 12 for supplying elastomeric elements and at least one station 14 for laying said elements. An "elastomeric element" means an elastomeric product which may be reinforced, calendered or extruded according to a given profile, so as to form a continuous strip or ply and, by extension, a set of preassembled elastomeric elements. An elastomeric element is generally wound on a reel 15.

The laying station 14 comprises a drum 16 for manufacturing tire blanks (partially shown) and at least one collaborative robotized arm 18 equipped with at least one effector 20. A "laying station" generally means the zone in which the elastomeric elements are laid in place. The manufacturing facility comprises a control unit able to manage the supply station and the laying station.

The drum 16 takes the form of a cylinder, generally straight, with a revolutionary symmetry about a central axis 22. The drum is movable in rotation around the central axis relative to a support 24, wherein the support itself is fixed or movable in the horizontal plane by means for example of a carriage, or movable in several directions by means for example of a multiaxis industrial robot. The radially outer surface of the drum constitutes a laying surface with which the first element(s) laid are in contact. The second element(s) laid are in contact with the radially outer surface of the first elements laid.

The robotized arm 18 is of the anthropomorphic type with six axes and comprises a series of five segments of variable length which are hinged together via four joints. For example, a joint is created by the shaft and two pivots and is actuated by an electric motor. A first end of the arm with a foundation 26 is mounted so as to be pivotally movable via a first joint, the foundation being arranged on a fixed structure 28, and a second end with the effectors, known as the baseplate 30, is mounted so as to be pivotally movable via a final joint. Depending on the effectors 20 used and the arrangement of the laying station 14, the arm 18 may take various forms with more or fewer axes of mobility.

The robotized arm 18 is suitable for automatic and successive laying of elastomeric elements on the drum 16. The effectors allow performance of the automatic laying and are selected from the following group: pincer, sucker, roller, shears, blower, spray, applicator.

The term "collaborative" means that a robotized arm 18 is designed to perform tasks in collaboration with an operator. In other words, the arm comprises proximity detectors able to detect the presence of an operator in the environment of the laying station, and/or force sensors able to detect, on movement of the arm, an unexpected return of force, for example on collision with the operator. Thus the arm may be immobilized or its movements adapted to allow the operator to move and intervene safely on the laying station.

For example, the manufacturing facility 10 comprises two robotized arms 18. The fixed structure 28 on which the arms 18 are fixed takes the form of a metallic frame which at least partially delimits a workspace 32 for an operator. The workspace 32 is dimensioned to allow the operator to observe the automatic laying of, or to manually lay, an elastomeric element without being obstructed by the robotized arms. To this end, the foundations 26 of the arms are axially sufficiently far apart, preferably by 0.5 m to 1.5 m, to allow the operator to manually lay an element or elastomeric assembly between the arms without being obstructed, and/or to allow the arms to grasp the elastomeric element over all or part of the strip length while minimizing the extension of the arms, wherein excessive extension of an arm in a given direction creates a so-called "cantilever" situation which causes returns of force similar to those of a collision with an operator, and consequently the immobilization of the arm. Then the foundations 26 of the robotized arms are sufficiently raised vertically, preferably by at least 1.5 m, from the base of the workspace 32 to allow the operator to manually lay an elastomeric element without the arms disrupting his field of view. Finally, the foundations of the robotized arms are arranged over the drum 16, preferably at ±0.5 m from the central axis 22 of the drum in the horizontal direction, so as to allow the arms to easily access the drum and the supply station 12 while minimizing the extension of the arms.

A stage of laying an elastomeric element comprises a predetermined sequence of steps. According to the disclosure, the automatic and successive laying of elastomeric elements includes instructions which can be executed by a processor of the control unit, said control unit also comprising a memory accessible by said processor, the memory containing said instructions which, once executed, cause the processor to implement:

a stage of automatic performance of a step according to said sequence, a stage of interruption of said sequence, a stage of manually performing the interrupted step or the next step according to said sequence.

The manufacturing facility comprises first measurement means able to evaluate the state of the tire blank during production, second measurement means able to evaluate the state of the manufacturing facility, and a database containing data taken from the first and second measurement means and associated with the stages of automatic laying previously performed and associated with the success or failure of said stages. The database is accommodated on a server belonging to the control unit.

For example, the first measurement means comprise means for measuring the mass and balance of the blank around the central axis 22 of the drum, such as a deformation gauge, and means for measuring the dimensions of the blank, such as a laser profilometer. Preferably, the first measurement means comprise three-dimensional vision means able to precisely characterize the profile of the blank and/or of the elastomeric element in real time during laying.

For example, the second measurement means also comprise three-dimensional vision means able to scan the environment of the laying station, and force sensors of the robotized arms able to measure the return of force in the arms during laying of an elastomeric element. Thus the second measurement means are able to evaluate the tension in the elastomeric element drawn towards the drum, or guided so that the element is wound as a substantially straight cylinder.

For the purpose of processing the data taken from the vision means, and to avoid any slowing down during management of the laying stages, the control unit comprises suitably dimensioned calculation means. Also, the manufacturing facility comprises means of communication with the operator such as a light column or a portable digital device connected to the control unit by Wi-Fi.

The control unit is able in particular to manage the automatic laying of elastomeric elements and request a manual laying stage. Using the first and second measurement means, management of the laying is adapted to the characteristics of the elastomeric element to be laid in place, such as the dimensions, rigidity and ductility.

Also, the control unit is able to update the database with data taken from the first and second measurement means during the manual or automatic laying, and to update the list of known corrective actions on the basis of data taken from the second measurement means during the manual or automatic laying.

The supply station 12 for elastomeric elements comprises a multiaxis industrial robot 34 able to manipulate a container bearing an elastomeric element. To this end, the robot is equipped with vision means. A "supply station" also means the zone in which the industrial robot is situated. The supply station 12 is adjacent to the laying station 14 and comprises a storage space 36 in which the containers are arranged. For example, the containers take the form of reels 15, dispensers 38 containing a reel 15, or roller tables supporting an elastomeric element unsuitable for storage on a reel. The number of containers present at the storage space 36 is adapted to the number of elements to be laid in place during manufacture of a tire blank, so as to limit the area of the storage space.

Method for Manufacturing Tire Blanks

Figure 2:
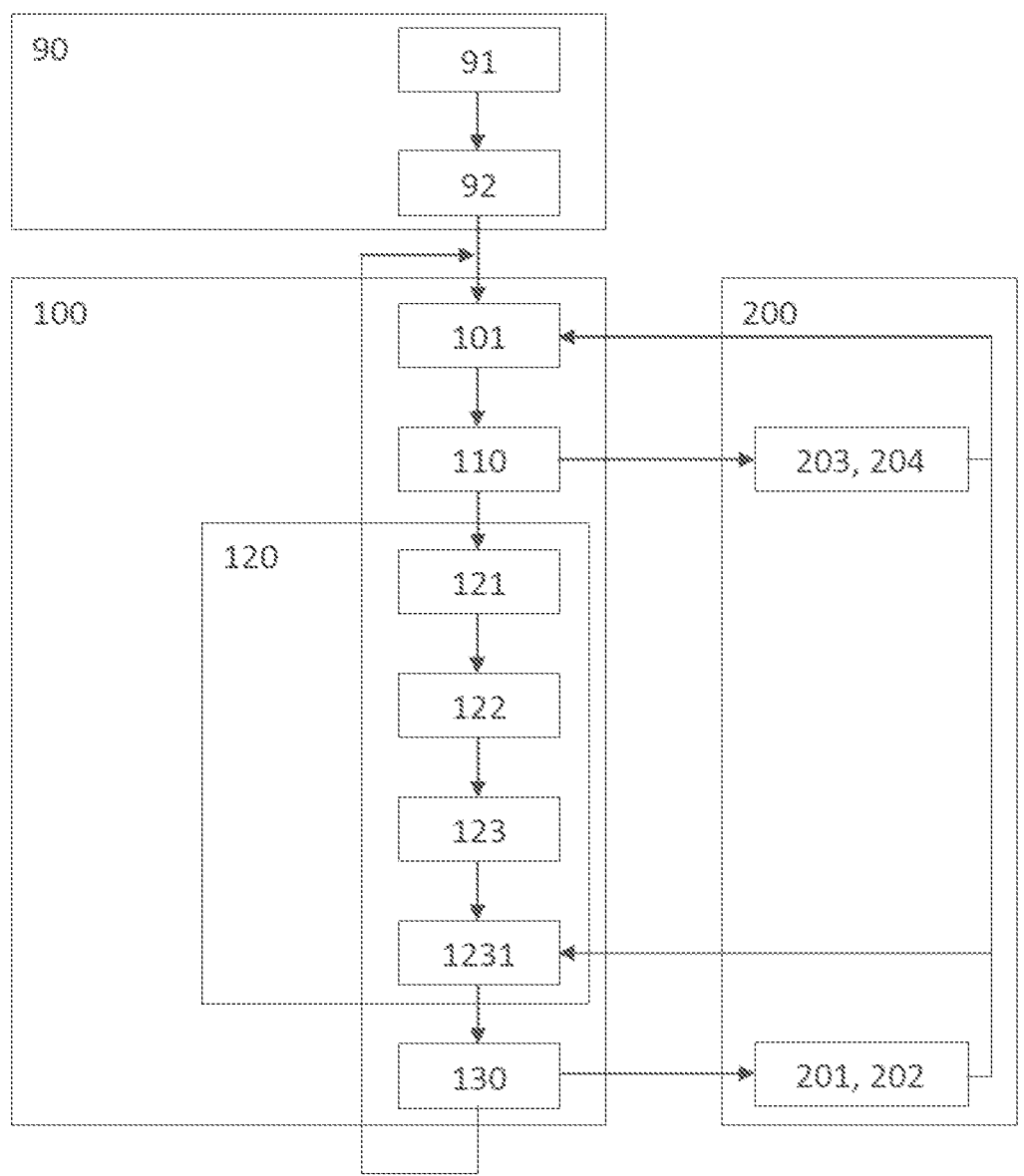
FIG. 2 is a flowchart illustrating certain stages of the method according to the disclosure.

The flowchart in FIG. 2 illustrates a method for manufacturing a tire blank which comprises in particular the successive laying 100 of elastomeric elements using a manufacturing facility 10.

To this end, prior to laying, the method comprises a stage 90 of supplying the elastomeric element to the laying station 14 by means of the supply station 12, wherein the element to be laid takes the form of a continuous strip or ply. The supply stage comprises a sub-stage 91 of grasping a container such as a reel 15, a dispenser 38 containing a reel 15, or a roller table, by a multiaxis industrial robot 34 or an autonomous carriage, each container containing an elastomeric element to be laid, and a sub-stage 92 of positioning the container such that the elastomeric element is in a condition to be laid.

The method then comprises a laying stage 100 which is managed automatically by the control unit. At least one collaborative robotized arm 18 equipped with at least one effector 20 automatically lays the elastomeric element on a drum 16 for manufacturing tire blanks. A laying stage comprises a sequence, applied to the element to be laid, comprising steps of detection, grasping, drawing towards the drum 16, laying and fixing to the drum, guiding during winding around the drum, cutting and joining. The arm 18 implements the automatic laying stages successively.

The automatic and successive laying of elastomeric elements includes instructions which can be executed by the processor of the control unit in order to implement the method. According to the disclosure, the method comprises a stage 110 of automatic performance of a step according to said sequence, a stage 120 of automatic interruption of said step or said sequence, and a stage 130 of manual performance of the interrupted step or the next step in said sequence. After the manual stage, automatic performance of the sequence of laying an element resumes.

The interruption stage 120 comprises a sub-stage 121 of identifying an indication that an automatic laying stage in progress has not been performed successfully, a sub-stage 122 of determining a corrective action to be taken, and a sub-stage 123 of managing the determined corrective action, comprising communication of an intervention instruction to the operator.

The control unit identifies an indication that automatic laying stage in progress has not been performed successfully, using first measurement means able to evaluate the state of the tire blank during production, second measurement means able to evaluate the state of the manufacturing facility, and a database comprising predefined laying tolerances or preferably data taken from the first and second measurement means and associated with automatic laying stages previously performed and associated with the success or failure of said stages. In other words, the control unit compares the data collected during the laying stage in progress with data collected during previous laying stages. Prior to comparison of the data, an operator evaluates the state of the tire blank during the automatic laying stages previously performed, and informs the database so as to associate this with success or failure of said stages.

Then the control unit selects a corrective action to be performed from a list of known corrective actions, according to predefined criteria.

The control unit then manages the selected corrective action. According to a variant, the control unit may manage an automatic corrective action such that the laying stage in progress is performed successfully. Thus the stage of managing the corrective action also comprises sub-stages of scheduling, performance and verification of the corrective action. Preferably, when the selected corrective action is manual, or when the automatic corrective action has not been performed successfully, the control unit gives the operator an intervention instruction.

The stages of automatic laying or implementation of an automatic corrective action are scheduled 101, 1231 according to a model comprising sequences of images of said laying stages or said corrective actions previously performed, according to an initial configuration of said image sequence and according to a final configuration of said image sequence.

Finally, the method comprises several capitalization stages in which:

the database is updated 201 with data taken from the first measurement means during manual laying;

the list of known corrective actions is updated 202 on the basis of data taken from the second measurement means during manual laying;

the database is updated 203 with data taken from the first measurement means during automatic laying;

the list of known corrective actions is updated 204 on the basis of data taken from the second measurement means during automatic laying.

What is claimed is:

1. A method for automatically and successively laying elastomeric elements using a facility for manufacturing tire blanks, comprising:

a drum for manufacturing tire blanks, at least one collaborative robotized arm equipped with at least one effector, a stage of laying a plurality of elastomeric elements on the drum, comprising a predetermined sequence of steps, the sequence comprising the steps of grasping and drawing each of the elastomeric elements towards the drum using said arm, wherein the automatic and successive laying of the elastomeric elements on the drum includes instructions which can be executed by a processor of a control unit in order to implement:

a stage of automatic performance of a step according to said sequence;

a stage of interruption of said sequence; and a stage of manual performance of the interrupted step or the next step according to said sequence, wherein the interruption stage comprises a sub-stage of identifying an indication that a stage of automatic performance of a step has not been successfully performed, wherein to implement said sub-stage, the manufacturing facility comprises first measurement means able to evaluate the state of the tire blank during production, second measurement means able to evaluate the state of the manufacturing facility, and a database containing data taken from said first and second measurement means and associated with the automatic steps previously performed and associated with the success or failure of said steps.

2. The method as claimed in claim 1, wherein the interruption stage comprises a sub-stage of detecting an operator at the laying station of the manufacturing facility using operator detection means.

3. The method as claimed in claim 1, wherein the first measurement means comprise three-dimensional vision means, and wherein the second measurement means comprise force sensors arranged on the collaborative robotized arm.

4. The method as claimed in claim 1, wherein the interruption stage comprises, following the sub-stage of identifying the indication that a stage of automatic performance of a step has not been successfully performed, a sub-stage of selecting a corrective action to be performed from a list of known corrective actions and according to predefined criteria.

5. The method as claimed in claim 1, wherein the stage of manual performance of the interrupted step or the next step in said sequence comprises a capitalization sub-stage in which the database is updated with data taken from the first measurement means during the manual performance of said step.

6. The method as claimed in claim 4, wherein the stage of manual performance of the interrupted step or the next step in said sequence comprises a capitalization sub-stage in which the list of known corrective actions is updated on a basis of data taken from the second measurement means during the manual performance of said step.

7. The method as claimed in claim 1, wherein a step or a corrective action is scheduled according to a model comprising sequences of images of said steps or said corrective actions previously performed, according to an initial configuration of said image sequence and according to a final configuration of said image sequence.

8. The method as claimed in claim 1, wherein the stage of automatic performance of a step according to said sequence comprises a capitalization sub-stage in which the database is updated with data taken from the first measurement means during the automatic performance of said step.

9. The method as claimed in claim 1, wherein the stage of automatic performance of a step according to said sequence comprises a capitalization sub-stage in which the list of known corrective actions is updated on a basis of data taken from the second measurement means during the automatic performance of said step.

* * * * *